United States Patent [19]
Borner

[11] Patent Number: 5,661,599
[45] Date of Patent: Aug. 26, 1997

[54] REPRODUCTION DEVICE FOR PRODUCTION OF STEREOSCOPIC VISUAL EFFECTS

[76] Inventor: Reinhard Borner, Uhlandstrasse 145, 10719 Berlin, Germany

[21] Appl. No.: 532,608
[22] PCT Filed: Apr. 13, 1994
[86] PCT No.: PCT/DE94/00415
    § 371 Date: Oct. 12, 1995
    § 102(e) Date: Oct. 12, 1995
[87] PCT Pub. No.: WO94/24601
    PCT Pub. Date: Oct. 27, 1994

[30] Foreign Application Priority Data
    Apr. 14, 1993 [DE] Germany .......... 43 12 918.8
[51] Int. Cl.⁶ .................................. G02B 27/22
[52] U.S. Cl. .................................. 359/463
[58] Field of Search .................. 359/463, 619, 359/464, 456, 459; 348/59; 352/61

[56] References Cited
U.S. PATENT DOCUMENTS
2,361,347  10/1944  Brown .................. 359/463
5,083,199  1/1992  Borner .................. 359/464

FOREIGN PATENT DOCUMENTS
354851 A2  2/1989  European Pat. Off. .
404289 A3  2/1992  European Pat. Off. .

*Primary Examiner*—Jon W. Henry

[57] ABSTRACT

The reproduction device of the invention can be used, for instance, for work station structures for an active person with autostereoscopic vision and several passive monoscopically viewing observers and large-scale presentation structures. This reproduction device generates in the filed of observation two large, undistorted mono-regions, between which there is a stereo region. On the transition from the stereo region to one of the two mono-regions, the observer sees monoscopically immediately without any pseudoscopic intermediate effects. Mono-stereo compatibility in the stereo region is provided with identical partial images. The convenience for the observer in the stereo region can be further improved by head-tracking.

12 Claims, 4 Drawing Sheets

REPRODUCTION DEVICE FOR PRODUCTION OF STEREOSCOPIC VISUAL EFFECTS

BACKGROUND OF THE INVENTION

1. Field of the Invention

The invention relates to a reproduction device for the production of stereoscopic effects in at least a locally limited zone of its observation zone which is located in front of it, with:

a flat display screen, on which stereo images can be shown as vertically divided image strips which are rastered together pairwise, and a lenticular plate, which is mounted in front of the flat display screen and bears vertically running cylindrical lenses, which are associated each with a respective image strip pair displayed on the flat display screen.

2. Discussion of Relevant Prior Art

Such a reproduction device can already be derived from a large number of publications, since it is suitable for the production of images which are perceptible autostereoscopically, that is, three-dimensionally without additional optical auxiliary means.

The reproduction device known from DE-OS 39 21 061 forms the state of the art from which the invention proceeds; in it, the three-dimensional imaging character of the images produced is attained by a rastering together, in strips on a flat display screen, of two camera signals which are recorded from the object to be imaged in the natural eye spacing, and by a separate supply of the image strips by means of a lenticular plate mourned in front, to the left or right eye of the viewer. An air gap is present between the display screen and the lenticular plate. Means can be provided in such a reproduction device for improving the quality of the locally limited space image reproduction. Correction measures on the lenticular plate itself, such as a change of the lens pitch width or plate thickness, count as such means. For a reproduction device having a surface relief structure which reduces interfering light, it is known from EP-OS 0 493 863, in addition to the said corrective measures, to change the radii of the individual cylindrical lenses.

It is further known from the above-cited DE-OS 39 21 061 to effect an optical image correction by changing horizontally and frontally the relative, plane-parallel position of the lenticular plate with respect to the display screen. A variable air gap is provided for this purpose between the lenticular plate and the display screen. The positional correction takes place in dependence on the eye position of a single viewer, so that an adjustment of the image content for him is possible. The viewer no longer needs to hold his head relatively stiffly. Such image matching can be effected manually, by remote control, or interactively by a corresponding detection of the viewer's eye position, in order to attain a further improvement of comfort (so-called "head tracking process").

For the same problem, a system is also known from EP-A 0 354 851 which has vertically divided image strips which are pairwise rastered together on an active display screen, electronically controlled in order to be displaced by the amount of a respective pixel column when the viewer leaves a zone in which the heretofore stereoscopic effect was perceived by him. In this manner he also perceives the same image content as before in his new position. This solution, in order to offer the viewer a large freedom of movement in front of the reproduction device, thus stands instead of the mechanical-optical measures according to the previously mentioned DE-A 39 21 061.

The said aspects are also to be gathered, in the nature of general statements for the technological background for such reproduction devices, from a series of other documents. At this point there may be mentioned the articles, "Three-Dimensional in Large Format" (W. Hascher, Funkschau 15/1992, pages 22–26; "A Display for Autoscopic 3D-Television" (H. Isono, M. Yasuda, NHK Lab. Note No. 398, 12/91, compiled by Dr. G. Pollakowski, printed in Fernseh-und Kino-Technik (Television and Cine Technology) 5/1992, Year 46, pages 343–345); "Interactive stereoscopic computer graphic display systems" (N. Storey, J. F. Craine, Conference Papers Vol. 326, Interact '84, First IFIP Conference on "Human-Computer Interaction", Sept. 4–7, 1984, London, pages 382–387) and "Three Dimensional Media Technology" (Proceedings of the 1989 International Conference, Hal Thwaites, published by the 3Dmt Research and Information Center, Montreal, Quebec, Canada).

To achieve as natural as possible a spatial depth effect, the reproduction devices according to the said state of the art strive for a high horizontal image resolution by means of as fine as possible a rastering together, parallel to the lenses, of the two partial images of a stereo photograph. (It is also known, from the said article "Three-Dimensional in Large Format", W. Hascher, Funkschau 15/1992, pages 22–26, to use the signals from four color cameras for 3D representation, but again only two signals are used per viewer. Hence such photographic processes are to be included in the concept of "stereo photographs".) Because of the imaging geometry of the cylindrical lenses to be used for a high depth resolution, relatively narrow zones arise in the whole observation range, with the information for either the left or the right eye of the viewer. The narrow zones lie alternatingly adjacent, and the viewer has to choose his head position so that each of his eyes is associated with the correct narrow zone. Only then can the images be perceived autostereoscopically. If the viewer alters his position such that the image information is supplied to his eyes in an incorrect relationship, he sees pseudoscopically, with a false perception of depth. Sudden jumps in depth occur in the transition into the zones of pseudoscopic vision. However, the pseudoscopic zones are disturbing for the viewer. In order to obtain constantly correct image information, the viewer must hold his head in a very narrowly limited observation zone. Double images arise in the image edge regions by internal and external image crosstalk.

SUMMARY OF THE INVENTION

The object of the present invention is to provide a reproduction device that has zones with more or less suitable viewer positions, distributed over the observation region, and besides these, viewer positions which are unsuitable, in particular because of pseudoscopy.

Such problems can be solved, according to the teaching of the invention, in that the lenticular plate with its cylindrical lenses (lens segments) has a structure, with respect to its parameters, pitch width of the cylindrical lenses and also thickness and refractive index of the lenticular plate, based on which there arise two, at least directly adjacent, mono-zones in the observation region and with a respectively large zone width, and a central stereo zone in the transition region between or within the mono-zones; in that these parameters, with respect to a preassigned distance of the lenticular plate to a central viewing plane, are dimensioned according to the relationships given by the equation of beam geometry:

$$Z = \frac{E}{\sqrt{\frac{1}{n^2}\left(\left(\frac{T}{P/2}\right)^2 + 1\right) - 1}}$$

The symbols here denote the respective quantities:
Z: Zone width of a mono-zone
E: Distance between lenticular plate and central viewing plane
n: Refractive index of the lenticular plate
P: Pitch width of the cylindrical lenses.

This structure of the reproduction device according to the invention makes it possible that the images produced by a stereo photograph are autoscopically perceivable for at least a central viewer in a central stereo zone of the observation region, and images from such stereo photographs, as also from identical partial images of a mono-photograph, are monoscopically perceivable, respectively by several viewers, in two large mono-zones, laterally at least directly adjacent to the stereo zone, of the observation region.

In the reproduction device according to the invention, a stereo-mono compatible device is concerned, which at the same time permits both an autostereoscopic perception by a central viewer, and also a monoscopic perception by several viewers in lateral positions, of one and the same image. For this purpose, the whole viewing region is divided into two large regions, which form the individual zones. These regions are large mono-zones, in which exclusively the left or the right signal of the stereo image photograph is used for image production. The region of the left image signal forms one of two large mono-zones, in which, because of its large extent, a whole series of viewers can perceive the image monoscopically with both eyes. Correspondingly, the region of the right image signal forms the other large mono-zone, in which also there is room for several viewers, who likewise see monoscopically. Because of the small signal spacing (eye spacing) in the case of stereo photographs, the image contents of the left and right large lateral zones differ only slightly. The viewers all receive, with corresponding partial images of a mono photograph, completely identical image information. The display screen of the reproduction device according to the invention can thus be used as a mono display screen for all the viewers, in contrast to the usual two-channel stereoscopic display screens.

The central stereo zone is formed by a transition region between or within the two mono-zones. In it, the two mono signals simultaneously reach the eyes of a viewer in the correct relationship, which means that the viewer sees autostereoscopically. The viewer's left eye is then always in the left mono-zone, and his right eye in the right mono-zone. Hence the width of the central stereo zone corresponds approximately to twice the human eye spacing. This also determines, in conjunction with the position of the viewing plane, the depth of the central stereo zone. This has overall relatively small extents. If the central viewer passes with both eyes into one of the two large mono-zones, there immediately arises for him a monoscopic representation of the images, without pseudoscopic interfering effects. The spatial information is indeed lost to him in this mono-zone, but this can be sufficient for an orientation. It is however important that at no point in time is erroneous information be supplied to the viewer, nor does he lose visual contact with the image, although he is not compelled to hold his head stiffly. With a mono photograph with identical partial images in both large mono-zones, the central stereo zone is also compatibly converted into a mono-zone, or is integrated into the two large mono-zones.

The effect of the invention—defined autostereoscopy with two laterally adjoining large monoscopic zones—is comparable with constructions in the field of stereophony. Here also the object is to produce, by means of corresponding measures in the two-channel audio technology, a precisely defined region for spatial hearing, directly adjoined, without interfering pseudostereophonic effects, by large, excellent monophonic regions.

The reproduction devices according to the invention can be devices with an active display screen, in general a direct visual display, or a passive display screen for back projection. The display screen is of flat construction. The size of the display screen can extend into the large image region; that is, the possibilities of application lie both in the field of desktop equipment (workstations, picture telephones) and also in the field of large image projection. The image production includes static and moving, single or multiple color, images photographed in stereo (especially also 3D-video images, computer-generated images or graphics). Mono reproduction or mono programs are also possible by equalizing the signals on the two channels.

Because of the spatial extent of the central zone, as a rule the central zone is occupied only by a single central viewer. The further positioning of two or more central viewers is only possible by superposition (for example, seated and standing). The central observer can be an actively working person, for whose work the three-dimensional information without pseudoscopic effects is primarily important. In the large lateral zones, on the other hand, a series of observers have room, also spacially superimposed. They all receive practically identical monoscopic, correct information. The field of application of the reproduction device according to the invention is thus to be seen as emphasized in situations in which an active person is surrounded by one or more passive persons. Applications are possible in medical operations or technical manipulations. However, pure object representations are also conceivable, in which a passive viewer can pass successively through the three zones and thus receive different impressions of the displayed object without losing visual contact with it.

The size of the observation zones depends, among other things, on the imaging geometry of the cylindrical lenses which are used. A particularly advantageous embodiment of the reproduction device according to the invention is therefore when the cylindrical lenses have a large aperture angle, due to the choice of an upper limiting value for the pitch width with respect to a small thickness of the lenticular plate, so that the whole observation region is divided into two equally large regions, the mono-zones.

The large mono-zones have the advantage that the whole observation region is utilized. A larger aperture angle produces, as is known, a spatially large imaging region. However, its limitation by the finite scattering width of the image strip pairs to be imaged has to be considered here, to avoid blurred images. Moreover a viewing angle of about 10' at the cylindrical lens (minimum visual angle), below which this remains invisible to the human eye, should not be exceeded. If the pitch width and the thickness of the lenticular plate are constant over the whole display screen width, the aperture angle is also constant. For a first precondition with respect to the relationship between the size of the pitch width of the cylindrical lenses and the thickness of the lenticular plate, it should be noted that this should preferably lie in the region of the same order of magnitude. In the state of the art mentioned at the beginning, the thickness is at least an order of magnitude greater than the pitch width.

The choice of the limiting value for the relationship between the pitch width and the thickness, in order to obtain as large an aperture angle as possible, and hence mono-zones as large as possible, is however not only dependent on the finite scattering width of the image strip pairs and the visual angle condition. In particular, the effect of a total reflection, which prevents a perception of the image, is to be considered. Total reflection is present when a light beam incident on the inner surface of a cylindrical lens does not leave the lens, but is reflected. In the limiting case of total reflection, the just still emergent outermost side beam runs parallel to the surface of the lenticular plate. The limiting angle for total reflection arising here is a constant of the material. Light beams lying within the limiting angle are reflected to the pixel plane. A knowledge of the material properties of the lenticular plate, and of its geometrical relationship to the viewer, is required for a determination of total reflection. It is therefore advantageous, according to a further embodiment of the reproduction device according to the invention, if the parameters of pitch width and thickness are dimensioned in dependence on further parameters of the reproduction device—display screen width, distance of the viewer, refractive index and radius of curvature of the cylindrical lenses—as regards their limiting values, while preventing internal reflections due to total reflection at the curved surfaces of the cylindrical lenses. This dimensioning provision represents an important precondition for further developments of the invention.

The determination of the individual parameter values in order to attain the optimum relationship of pitch width to plate thickness can only take place in their complex relationship. The calculation equations and their solution are preferably effected iteratively by computer. An assumption relating to the precondition of prevention of total reflection considerably simplifies the amount of calculation. It is therefore of particular importance, according to a following embodiment of the inventive concept, if all cylindrical lenses are designed according to the outermost cylindrical lens, dimensioned with respect to total reflection, at the left-hand or right-hand edge of the lenticular plate.

This measure makes possible a calculation of all parameters on the safe side. The edge regions of the display screen have an angle of view which is unfavorable for the viewer, since he looks particularly obliquely into the lens there. If it can now be ensured by a corresponding choice of the parameters that even the outermost beams from the display screen edges reach the viewer without the onset of total reflection, then with certainty so do all the other beams, which lie closer to the middle of the display screen, and a qualitatively high quality image perception is guaranteed for each viewer. Further explanations and statements regarding the manner of proceeding and concerning the calculation itself are to be gathered from the special portion of the description.

The determination of the parameters, pitch width of the cylindrical lenses and thickness of the lenticular plate, which are important for the size of the mono-zones was heretofore entered into in dependence on the other parameters. Since the parameters are, at least regionally, in a continuous dependence on one another, it is also possible, according to a further development of the reproduction device according to the invention, that other parameters—zone width and depth of the large mono-zones; display screen width—can be established in dependence on the respectively remaining parameters by the choice of their limiting values. An optimum fitting of the individual parameters, respectively according to requirements, can thus be carried out within given ranges. The determination of the values takes place iteratively, under the precondition of preventing internal reflections, especially in the edge regions.

According to another development of the reproduction device according to the invention, the cylindrical lenses are aspherically curved at their surfaces. The curvature can be made elliptical, for example. A high imaging quality of the lens is attained by this measure. In the viewing center, a clean channel separation results. Moreover it is advantageous if, according to the invention, each individual cylindrical lens has on its lateral borders, reflection surfaces at which incident light beams are reflected through the middle of the lens. Beams from adjacent lenses are prevented from entering. The yield of light per cylindrical lens is then maximum, and leads to images of higher light intensity. Light guiding of this kind can be achieved by narrow slits or inlays at the rear side of the lenticular plate, between the individual cylindrical lenses and in the direction of their long axes.

Embodiments of the reproduction device according to the present invention concerning corrective measures with respect to the pitch width and radius of curvature of the cylindrical lenses, tho width of the image strip pairs, and also the thickness of the lenticular plate, provide an improvement of the optical reproduction quality of the images produced. Such measures and their great effectiveness are already expressly known from the abovementioned state of the art. To avoid repetition, they are not further discussed at this point.

The use of relatively wide cylindrical lenses with a large aperture angle to attain large imaging regions entails that the image strip pairs located behind the individual cylindrical lenses are also relatively wide. On striving for a similar depth of the observation region as with display screens with a lenticular plate with narrow cylindrical lenses, the total display screen width is correspondingly increased. According to the case of application, however, a smaller depth of the observation region can be permitted, in order, for example, to be able to use an available display screen. Image strips which are widened, or interconnected, adjacent pixel columns, can be used here, according to the kind of image composition. However, with active display screens, it is particularly advantageous, according to a next embodiment of the invention, if a respective image strip pair is associated with each of the wide cylindrical lenses, each individual strip being produced with a single column of relatively large pixels. There then occur no image disturbances when the viewer moves laterally in the mono-zones, since no separating lines are present between the individual pixel columns, as with the interconnection of several pixel columns for a wide image strip. The driving of the wide pixel columns is simple. In the order of magnitude of the dimensions, a wide pixel can, for example, cover four pixels of normal width.

According to another embodiment of the invention, a device for tracking the produced image content can be provided which, during autostereoscopic viewing of an image, continuously detects the eye and/or head position of the viewer and adjusts the image content produced to the eye position within the stereo zone. If an air gap is provided in the reproduction device according to the invention between the display screen and the lenticular plate, the relative position of the display screen and the lenticular plate can be changed in the horizontal direction and in depth, in order to maintain the visual contact. The size of the observation region with possibility of tracking the central zone is dependent here on the control range of the lenticular plate position (shifting of the lenticular plate) in from of the display screen (stationary flat screen display). In reproduction devices with a large projection screen for a back-projection, either the control layer or the objective can be laterally moved or if necessary zoomed, in order to carry out head tracking. The projector itself should remain stationary, because of the large travel paths. The comfort improvement for the operator due to head tracking is of particular importance in just those cases in which the reproduction device according to the invention is used for applications in which a central viewer works actively, for example in a microsurgical operation. He does not need to keep his head rigidly still, as for example on a microscope. The position of the stereoscopic region is matched to his head position. The separating line between the two mono-regions is automatically set to his nose line, so that he can see autostereoscopically in an optimum manner. As a result, the locations of optimum autostereoscopic perception are arranged on a curve around the middle of the display screen. Outside the tracking region, the central viewer sees monoscopically, free from interference. The observers in the large mono-zones are practically not disturbed by the image tracking for the central viewer, since the image content remains the same, although the mono-zones are displaced.

BRIEF DESCRIPTION OF THE DRAWINGS

Preferred embodiments of the present invention will now be described, taken together with the drawings, in which.

DETAILED DESCRIPTION OF PREFERRED EMBODIMENTS

Figure 1:
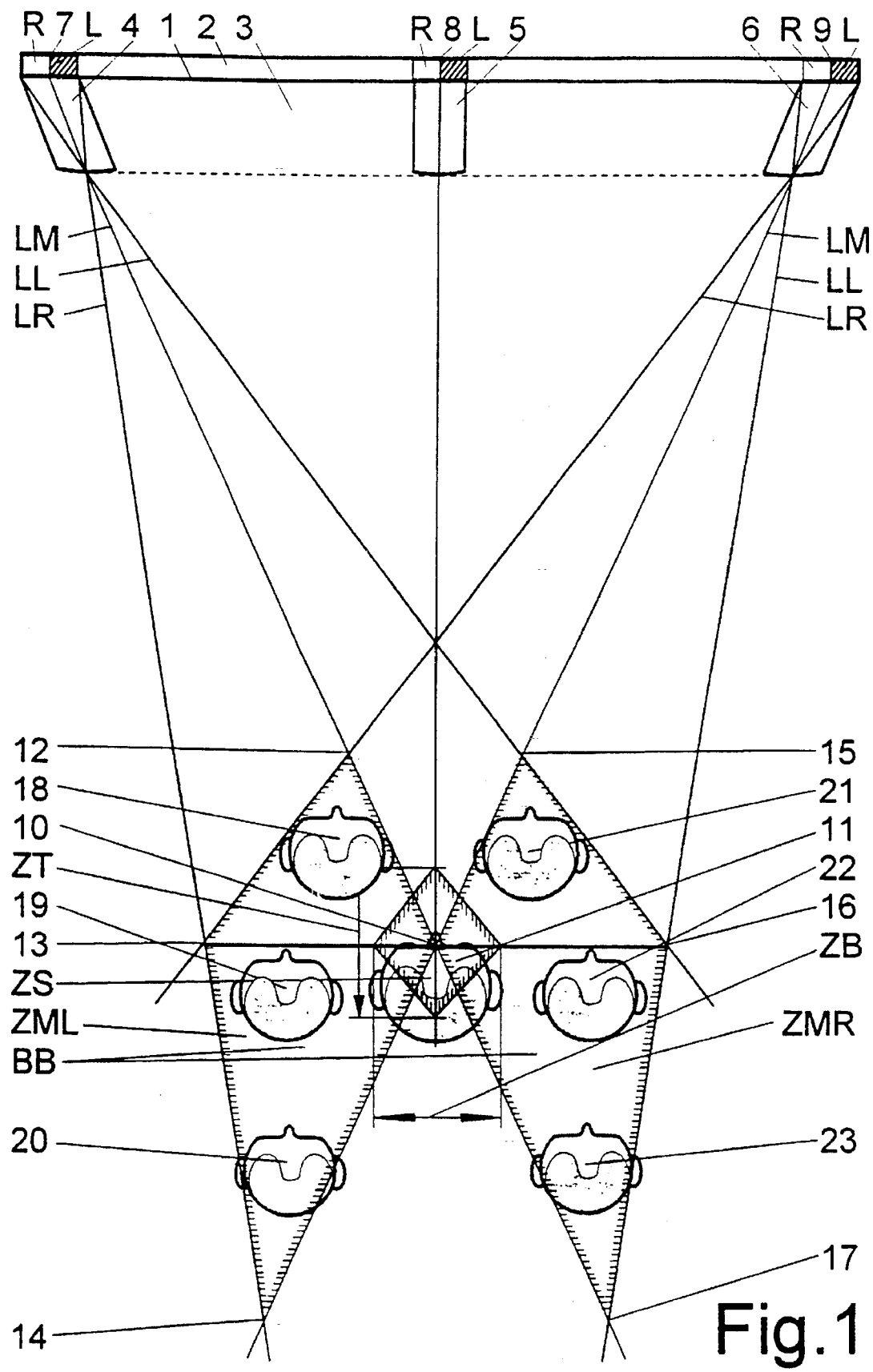
FIG. 1 shows the position and size of the individual perception zones of the reproduction device according to the invention.

A multi-zone reproduction device I is shown schematically in FIG. 1, by means of a flat display screen 2 and a lenticular plate 3 located in front of this. An observation region B for the perception of the images produced is located in front of the two-channel reproduction device 1. Image strip pairs 7, 8, 9, restart together, lie on the display screen 2 behind cylindrical lenses (lens segments) 4, 5, 6. Each image strip pair 7, 8, 9 consists of an image strip R which is produced by a right camera signal and an image strip L, which is produced by a left camera signal. Both camera signals derive from a stereo image photograph of the object to be imaged. The course of a middle light beam LM, a light beam LL at the left-hand edge and a light beam LR at the right-hand edge; from the cylindrical lens 4 in front of the image strip pair 7, are shown. Analogously to this, a middle light beam LM, a left-hand edge beam LL and a right-hand edge beam LR are likewise drawn for the cylindrical lens 6 in front of the image strip pair 9.

The intersection points of the light beams LL, LM, LR, which are representative of the imaging behavior of the cylindrical lenses 4, 5, 6, establish the vertices of the individual zones of the observation region B. A central stereo zone ZS is located in the region of an intersection point 10 of the two middle beams LM of the cylindrical lenses 4, 6. In this central stereo zone, at least one single central viewer 11 can perceive the images autostereoscopically, since his left eye sees exclusively the image strip L and his right eye the image strip R. The form of the central stereo zone ZS is rhombic. Its greatest width ZB corresponds to twice the eye spacing of the viewer 11, and its greatest depth ZT is dependent on his eye spacing and on the course of the middle light beam LM. The central viewer 11 is located in the central stereo zone ZS as long as the different image strips L, R are correctly associated with his eyes.

Respective large mono-zones ZML, ZMR are laterally adjacent to the central stereo zone ZS. A left-hand large mono-zone ZML is formed between the intersection point 10 and further intersection points 12, 13, 14. A right-hand large mono-zone ZMR lies between the intersection point 10 and further intersection points 15, 16, 17. Both mono-zones ZML, ZMR have the intersection point 10 in common in the embodiment example shown. Therefore they here not only are laterally directly adjacent to the central stereo zone ZS, but also overlap it. A distance of the two mono-zones ZML, ZMR from the common intersection point 10 up to a maximum at the eye spacing is possible.

Respectively only one camera image is available in the large mono-zones ZML, ZMR. Within these large mono-zones ZML, ZMR, several viewers 18 . . . 23 can monoscopically perceive the produced images. Here the viewers 18, 19, 20 see with both eyes exclusively the images of the left-hand camera setting, while the viewers 21, 22, 23 see with both eyes exclusively the images of the right-hand camera setting. Since the two settings are taken at the eye spacing from each other, the image contents mutually differ only slightly. The two large mono-zones ZML, ZMR are again rhombic in form, but with dimensions which are large compared with the stereo zone ZS.

When the central viewer 11 goes over into one of the two large mono-zones ZML, ZMR—and vice versa likewise for the viewers 18 . . . 23 into the central stereo zone ZS—no interfering pseudoscopic effects arise for them.

Figure 2:
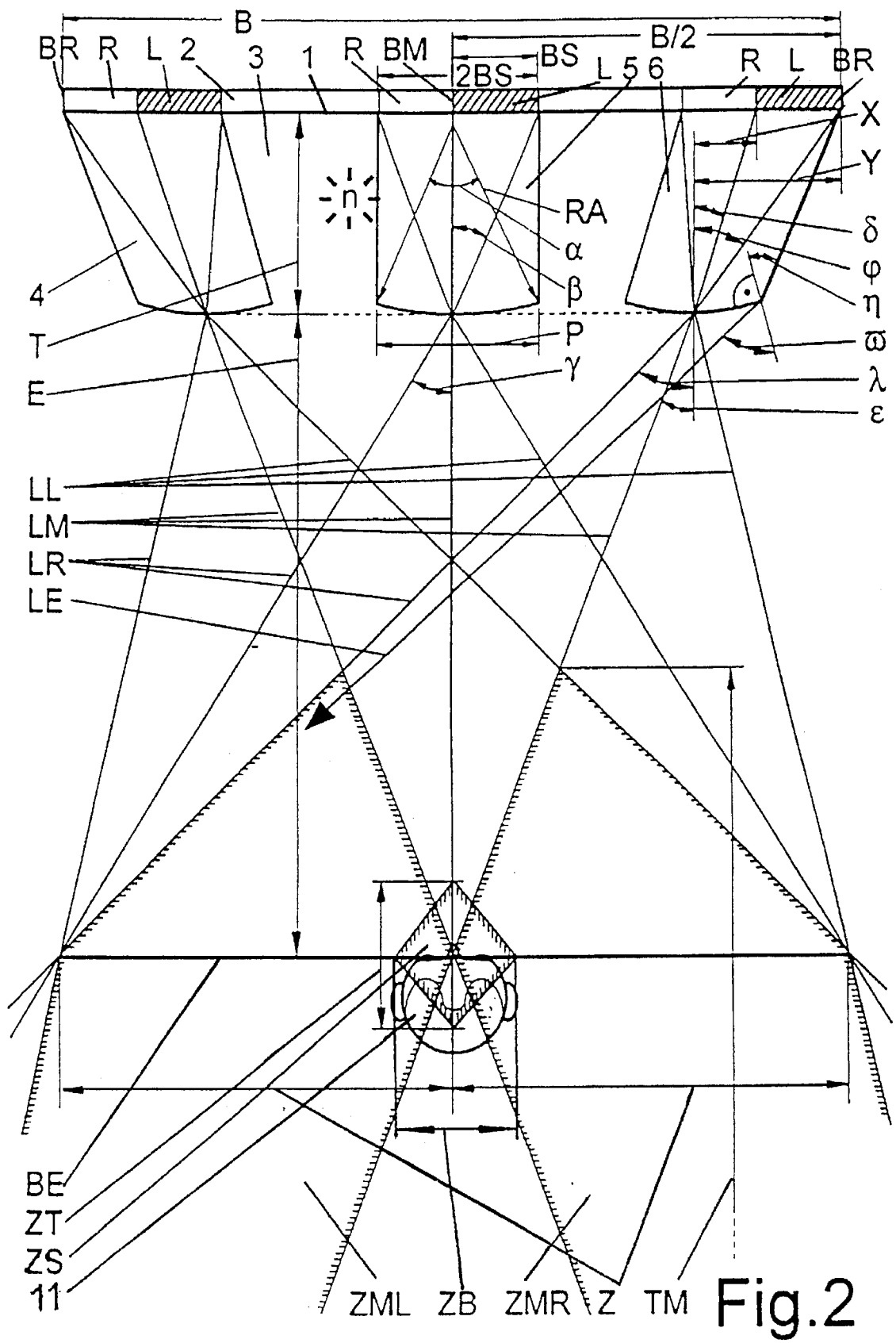
FIG. 2 shows the arrangement of the reproduction device according to the invention, giving all the important parameters.

FIG. 2 shows the more precise optical behavior in a reproduction device 1. Since mathematical formulae are required for the explanation of a possible dimensioning, all the important parameters are first to be illustrated with reference to FIG. 2. See FIG. 1 for reference symbols which are not mentioned.

Two distinguished regions on the display screen 2 of width B are shown: a display screen middle BM and, at a distance of B/2 from it, a display screen edge BR. Because of the symmetrical construction of the display screen 2, the behavior at both the display screen edges BR is the same. A respective strip pair L, R of the raster image stereo photograph is shown with a strip width BS in the display screen middle BM and at the display screen edge BR. The cylindrical lens 4, 5, 6, with a pitch width P, which at least in the display screen middle BM is equal to the strip pair width 2BS, is located in front of the strip pairs L, R. The cylinder lens 4, 5, 6 has a radius of curvature RA and an aperture angle α. The cylinder lens 5 is arranged in the display screen middle BM, in front of the image strip pair L, R; at the display screen edge BR, the cylinder lens 4, 6, in contrast to this, has a displacement, the pitch correction X, for optical correction reasons as already stated in the general description part. The pitch correction X constantly increases from the display screen middle BM to the display screen edge BR. The display screen edge BR lies, with constant strip width BS, by an amount Y=X+BS outside the midline of the outermost cylindrical lens 4, 6. The lenticular plate 3 carrying the cylindrical lenses 4, 5, 6 has a refractive index n and a thickness T. The thickness T of the lenticular plate can also be constantly varied (not shown) for correction reasons. The distance of the lenticular plate 3 to a central viewing plane BE is denoted by E.

A light beam LP coming from the right-hand edge of the image strip L behind the cylindrical lens 5 is incident at an angle $\beta$ in the middle of the cylindrical lens 5 and exits from it again at an exit angle $\gamma$. The left-hand mono-zone ZML, with a zone width Z, lies in the viewing plane BE between an unrefracted light beam LM passing through the middle of the cylindrical lens 5 and the light beam LR. The right-hand mono-zone, likewise with the zone width Z, is correspondingly formed by the light beam LL coming from the left-hand edge of the image strip R behind the cylindrical lens 5. Both mono-zones ZML, ZMR are formed perpendicular to the viewing plane BE in a rhombic form, and have a greatest depth TM.

The middle beam LM of the cylindrical lens 4, 6, because of the pitch correction X, is incident on the display screen edge BR at an angle of incidence $\delta$ and leaves it again at an exit angle $\epsilon$. The light beam LR coming from the right-hand edge of the display screen behind the cylindrical lens 4, 6 enters the middle of the cylindrical lens at an angle of incidence $\phi$ and leaves it again at an exit angle $\lambda$. At the outermost edge of the cylindrical lens 4, 6, an outermost edge beam LE enters at most at the limiting angle $\eta$ of total reflection and leaves it again at an exit angle $\omega$.

With the parameters mentioned, a brief overview will be given of the course of possible parameter calculations. All the equations given are derived from the geometrical relationships in the reproduction device 1, with the inclusion of known optical laws and trigonometric transformations.

For the display screen middle BM there holds:

$$T/P = 1/2 \sqrt{(n^2((E/Z)^2 + 1) - 1)} \tag{1}$$

Z can be calculated from (1) by transposition:

$$Z = \frac{E}{\sqrt{\frac{1}{n^2}\left(\left(\frac{T}{P/2}\right)^2 + 1\right) - 1}} \tag{2}$$

For the depth of the mono-zones ZML, ZMR there holds:

$$TM = \frac{E \cdot B \cdot 2Z}{B^2 - Z^2} \tag{3}$$

For the display screen edge BR there holds:

$$T/Y = 1/2 \sqrt{\left(n^2\left(\left(\frac{E}{B/2+Z}\right)^2 + 1\right) - 1\right)} \tag{4}$$

The limiting angle of the total reflection is a constant of the material. In the display screen middle BM or at the display screen edge BR there also holds the condition:

$$1/n \leq \sin\beta \text{ or } 1/n \leq \sin\phi \tag{5}$$

For an assumed n=1.5, the limiting angle of the total reflection is 41.8°.

The ratio T/P or T/Y is then calculated in an approximation as the limiting value under the assumption of the limiting angle of the total reflection:

$$(T/P) = (T/Y) = (1/2) \sqrt{(n^2 - 1)} \tag{6}$$

The pitch correction X at the display screen edge is calculated as:

$$X = \frac{T}{\sqrt{n^2\left(\left(\frac{E}{B/2}\right)^2 + 1\right) - 1}} \tag{7}$$

For the chosen ratios of R and t and of E and B, a maximum width Zmax of the mono-zones ZML, ZMR can be calculated. This calculation takes place for the middle beam LM of the outermost cylindrical lens 4, 6.

$$Zmax = B/2 - \frac{E}{\sqrt{\left(\frac{T}{n(X-P/2)}\right)^2 + \frac{1}{n^2} - 1}} \tag{8}$$

The maximum ratio of P/T can be calculated from (8) by corresponding transposition.

The above calculations represent an approximation, in which it is borne in mind that even a viewer looking laterally into the cylindrical lenses 4, 5, 6 experiences no reduction in quality of the perception, due to total reflection of the middle light beam LM. If moreover all the other inner reflections by total reflection of the light beams LL, LR, LE, deviating from the middle beam LM, are to be excluded, the outermost edge beams LE of each cylindrical tens 4, 6 at total reflection are also to be investigated at the display screen edge BR. If the outermost light beam LE of the outermost cylindrical lens 4, 6 is just not subject to total reflection, this holds for all the other light beams which lie further within.

Figure 3:
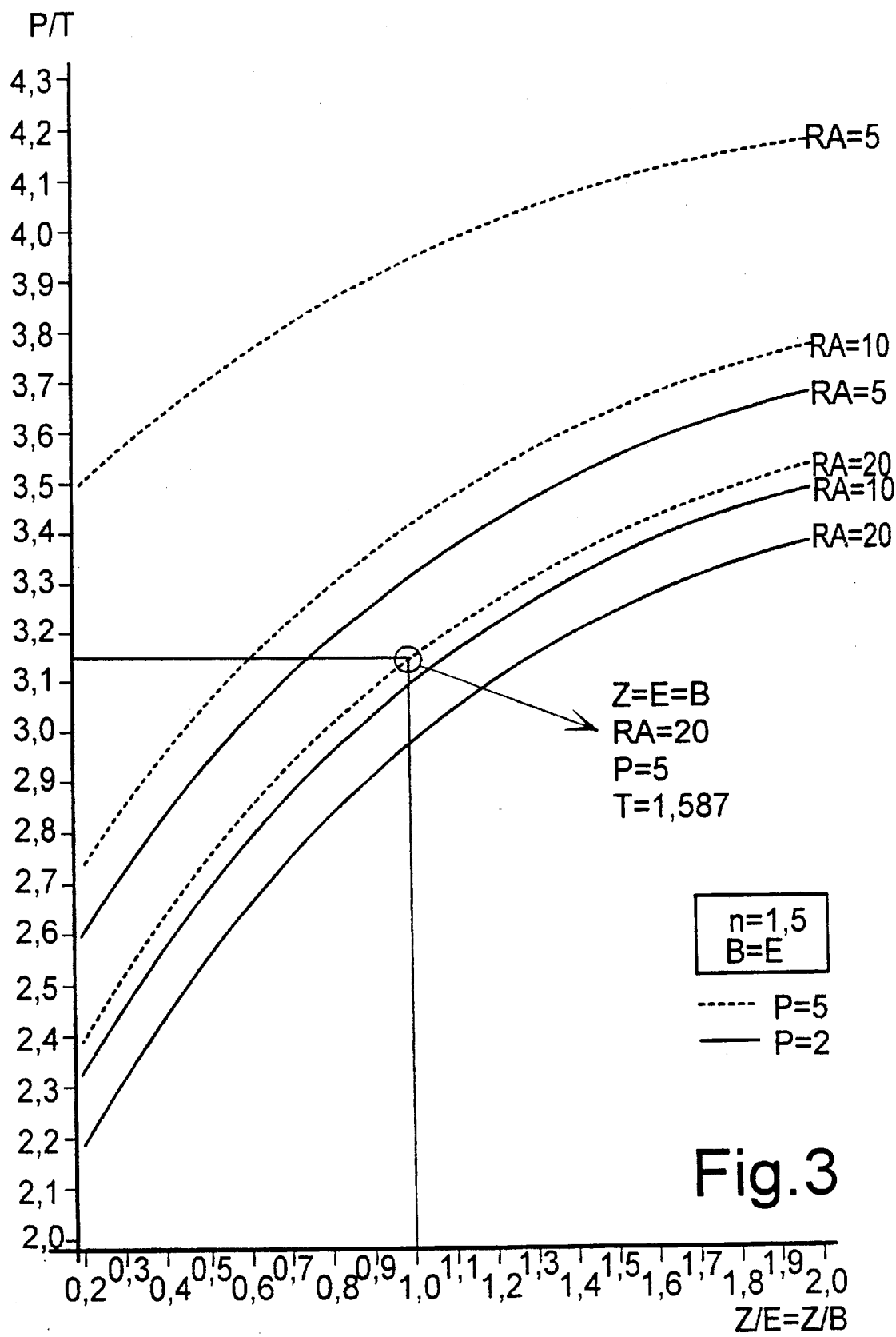
FIG. 3 shows a diagram for parameter estimation.

The individual parameters as boundary values under the condition of exclusion of any total reflection can be calculated from an implicit formula, preferably iteratively by computer. Here the formula is derived from the geometric relationships at the outermost cylindrical lenses 4, 6 and the outermost light beam LE. In particular, the radius RA of the cylindrical lenses 4, 6 is taken into account for the first time. The radius RA can also be varied for optical correction reasons (not considered here). The diagram in FIG. 3 presents an illustration of the relationships of selected parameter combinations in dependence on further parameters. It also serves as a dimensioning aid for the parameter constellation which has been chosen as an example. Other relationships are possible. A relationship is produced in FIG. 3 between the parameters E or B and Z on the one hand and also P and T. The dimension of all parameters is the same, millimeters in general. The refractive index n is established at 1.5 for glass. From practical considerations, E=B is set. The ratio P/T in a preferred region is given on the ordinate axis. For P=2 and P=5, Z is then calculated for each triple of values of RA, (5, 10, 20), set in the relationship with E and B, and plotted on the abscissa axis. Specifically, for example, for P=5 and T=1,59 (P/T=3.15), with RA=20 under the stated preconditions with, e.g., B=E=1,000, a width Z of the large mono-zones ZML, ZMR is calculated to be likewise 1,000 (Z/E=Z/B=1.0). The chosen numerical example is indicated in FIG. 3.

Figure 4:
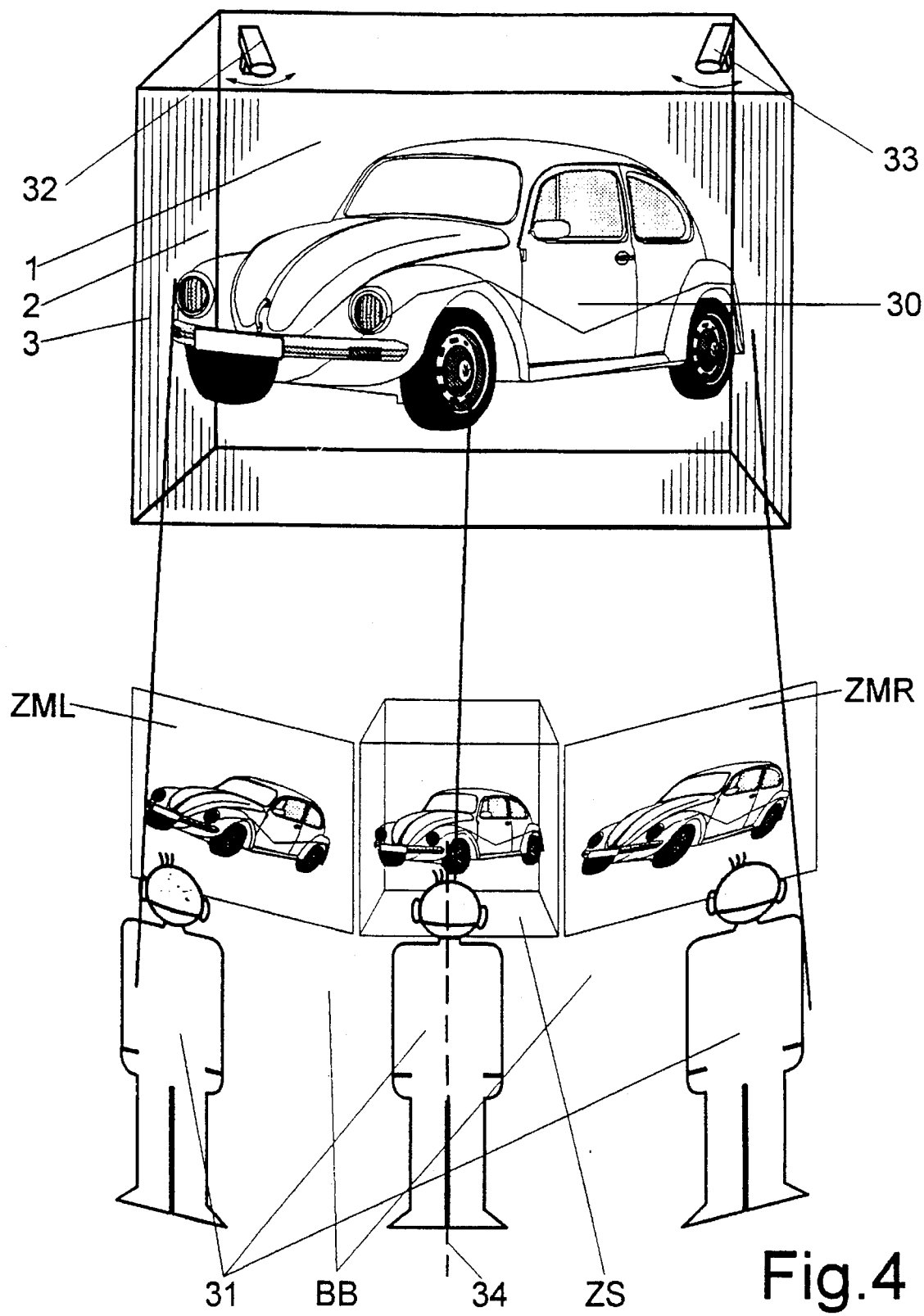
FIG. 4 shows a case of application of the reproduction device according to the invention for large image projection.

FIG. 4 shows a case of application of the reproduction device 1 with the use of the head tracking process. The reproduction device 1 is set in the presentation region, for example in an exposition. An object 30 to be shown is represented on the flat display screen 2 with a relatively large image diagonal, behind the lenticular plate 3, which is arranged, with an air gap, in from of the display screen 2.

The resolution of the image representation is so high that the required cylindrical lenses 4, 5, 6 with a large aperture angle in FIG. 3 are only indicated; they are not visible. The two mono-zones ZML, ZMR with the stereo zone ZS lying between them are produced in the observation region B by the reproduction device 1.

If a viewer 31 enters the observation zone B from the right, he arrives in the right-hand mono zone ZMR. Here he can first perceive the object 30 flat, for a first explanation. If the viewer 31 now steps from the right-hand mono-zone ZMR into the stereo zone ZS, he is captured by a head-tracking system. For this purpose, his eye position is registered by two camera-detectors 32, 33 and the object 30 to be represented is adjusted to him by means of a displacement of the lenticular plate 3 with respect to the display screen 2. The adjustment takes place by superposing the head midline 34 of the viewer 31 on the display screen middle BM. The viewer 31 now sees the object 30 autostereoscopically. The detectors seek the optional viewer 31 within a selectable detection region, and set the stereo zone ZS for him. Thus he does not have to assume a fixed head position. If he leaves the capture region (size 1 m×1 m), he reaches the left-hand mono-zone ZML. Here the viewer 31 can again receive a two-dimensional impression of the object 30. Only when the first captured viewer 31 leaves the capture region, the head tracking system seeks a new viewer.

I claim:

1. A reproduction apparatus for creating a three-dimensional image of pictures in a locally limited portion of a viewing zone that is located in front of said reproduction apparatus, comprising:

a flat image display screen for displaying a plurality of visually distinct image segments containing three dimensional information on parallel-disposed elongated strips having substantially mutually parallel vertical axes, a lenticular plate positioned adjacent said flat image display screen and provided with vertically running lens units for viewing said image segments therethrough, said vertically running lens units comprising a plurality of lens segments in registration with said image segments, each of said lens segments defining at least one curved surface, said lenticular plate being structured with respect to pitch width P of said lens segments, thickness T, and refractive index n of said lenticular plate, and a predetermined distance E of said lenticular plate to a central viewing plane according to the following equation of beam geometry:

$$Z = \frac{E}{\sqrt{\frac{1}{n^2}\left(\left(\frac{T}{P/2}\right)^2 + 1\right) - 1}}$$

where Z is the width of each of two at least adjacent monoscopic viewing zones in said viewing zone and locally limiting a single central autostereoscopic viewing portion that is small in relation to said two adjacent monoscopic viewing zones in a transition region between or within said two adjacent monoscopic viewing zones.

2. The reproduction apparatus according to claim 1, wherein said lens segments have an upper limiting value for said pitch width P in relation to a thickness T of said lenticular plate that is selected to form a large aperture angle α, whereby said viewing zone is entirely divided into two equally large monoscopic viewing zones ZML, ZMR.

3. The reproduction apparatus according to claim 2, wherein said pitch width P and thickness T are dimensioned according to the following additional parameters of said reproduction apparatus: limiting values for display screen width B, viewer distance E, refractive index n, and radius of curvature RA of said lens segments, to prevent internal reflections due to total reflection at curved surfaces of said lens segments.

4. The reproduction apparatus according to claim 3, wherein all of said lens segments are dimensioned according to an outer most lens segment at the left hand or right hand edge of said lenticular plate, which are dimensioned to prevent total reflection.

5. The reproduction apparatus according to claim 4, wherein said zone width Z and depth TM of said two equally large monoscopic viewing zones ZML, ZMR and said display screen width B are dimensioned according to selected limiting values of said respective additional parameters.

6. The reproduction apparatus according to claim 4, wherein said lens segments are aspherically curved at their surface.

7. The reproduction apparatus according to claim 6, wherein said lens segments have lateral borders with reflection surfaces on which incident light beams are reflected through the middle of said lens segments.

8. The reproduction apparatus according to claim 1, wherein each individual lens segment is increasingly displaced symmetrically with respect to respective associated image segments from the middle of said lenticular plate to its two side edges by reduction of said pitch width P of said lens segments or an increase of the width BS of said image segments, with other parameters of said reproduction apparatus being respectively constant.

9. The reproduction apparatus according to claim 8, wherein said thickness T of said lenticular plate increases symmetrically from the middle of said lenticular plate to its two side edges.

10. The reproduction apparatus according to claim 9, wherein the radius of curvature RA of said lens segments increases symmetrically from the middle of said lenticular plate to its two side edges.

11. The reproduction apparatus according to claim 1, wherein a respective image segment is associated with an individual lens segment, each individual image segment comprising a single column of relatively wide pixels.

12. The reproduction apparatus according to claim 1, further comprising a tracking device for tracking image content of said three dimensional image, continuously detecting eye and/or head position of a viewer during autostereoscopic viewing of an image and adjusting said image content to said eye position within said autostereoscopic viewing portion of said viewing zone.

* * * * *